US007806012B2

(12) United States Patent
Rice et al.

(10) Patent No.: US 7,806,012 B2
(45) **Date of Patent: *Oct. 5, 2010**

(54) ATTACHMENT ASSEMBLY AND DRIVE UNIT HAVING SAME

(75) Inventors: John R. Rice, Marshall, IL (US); Michael A. Ciavaglia, Dearborn, MI (US); Joseph M. Johnson, Huntington Woods, MI (US)

(73) Assignee: Strattec Power Access LLC, Troy, MI (US)

( * ) Notice: Subject to any disclaimer, the term of this patent is extended or adjusted under 35 U.S.C. 154(b) by 1399 days.

This patent is subject to a terminal disclaimer.

(21) Appl. No.: 11/221,499

(22) Filed: Sep. 8, 2005

(65) Prior Publication Data

US 2006/0055203 A1 Mar. 16, 2006

Related U.S. Application Data

(63) Continuation-in-part of application No. 10/784,333, filed on Feb. 23, 2004, now Pat. No. 7,297,082.

(60) Provisional application No. 60/519,021, filed on Nov. 10, 2003, provisional application No. 60/616,259, filed on Oct. 6, 2004.

(51) Int. Cl.
*E05F 11/48* (2006.01)
*F16H 19/06* (2006.01)

(52) U.S. Cl. ........................... 74/89.21; 49/324; 49/352

(58) Field of Classification Search .................. 74/89.2, 74/89.21, 89.22; 49/334, 345, 360, 324, 49/352; 198/728, 731, 733; 59/93; 403/339, 403/340, 385, 388; 474/202, 206, 237
See application file for complete search history.

(56) References Cited

U.S. PATENT DOCUMENTS 4,174,865 A * 11/1979 Doveinis ................. 296/146.2
6,367,864 B2 4/2002 Rogers, Jr. et al.
6,378,392 B1 * 4/2002 Dombrowski et al. ......... 74/422

* cited by examiner

*Primary Examiner*—William C Joyce
(74) *Attorney, Agent, or Firm*—Michael Best & Friedrich LLP

(57) ABSTRACT

A drive unit includes a gear set driving a drive pulley that in turn drives a flexible drive member which is attached to a driven member by an attachment assembly that travels in a channel. The attachment assembly is attached to the flexible drive member by a coupler that has teeth that extend through respective windows of the flexible drive member. The coupler is disposed between side walls of a yoke and attached to a bridge wall of the yoke. An outer shoe engages each side wall of the yoke. The attachment assembly includes an optional spring to tension the flexible drive member and the shoes have optional flexible tapered fingers to stabilize the drive pulley. The flexible drive member and the spring are trapped between the coupler and the bridge wall of the yoke. In an alternate arrangement, the flexible drive member is trapped between the coupler and fingers of the shoes that extend behind the flexible drive member and through spaces between adjacent teeth of the coupler and into sockets of the other shoe. The flexible drive member may be a drive chain or a drive belt having spaced windows.

11 Claims, 7 Drawing Sheets

ATTACHMENT ASSEMBLY AND DRIVE UNIT HAVING SAME

RELATED APPLICATIONS

This patent application is a continuation-in-part patent application of U.S. patent application Ser. No. 10/784,333 filed Feb. 23, 2004 now U.S. Pat. No. 7,297,082 which claims benefit of provisional patent application No. 60/519,021 filed Nov. 10, 2003. This patent application also claims benefit of provisional patent application No. 60/616,259 filed Oct. 6, 2004.

FIELD OF THE INVENTION

This invention relates to an attachment assembly for a drive unit having a flexible drive member that is suitable for use in a power operated closure system such as, for example, a power operated lift-gate system in an automotive vehicle.

BACKGROUND OF THE INVENTION

U.S. Pat. No. 6,367,864 B2 granted to Lloyd Walker Rogers, Jr. et al. Apr. 9, 2004 discloses a vehicle having a power operated lift-gate system that includes at least one drive unit. The drive unit comprises a fixed linear guide channel and an attachment assembly that moves in the guide channel. A rod is universally connected to the attachment assembly at one end and universally connected to the lift-gate at the opposite end. An endless flexible drive member that is attached to the attachment assembly wraps part way around two idler pulleys at the opposite ends of the guide channel and travels in a closed loop. The flexible drive member is driven by a bidirectional power unit that includes a drive sprocket. The drive sprocket drivingly engages the loop of the flexible drive member outside the drive channel midway between the two idler pulleys. The use of a flexible drive member raises a need for an attachment assembly that is simple and efficient, durable and economical to manufacture and assemble.

SUMMARY OF THE INVENTION

The invention provides an attachment assembly for attaching a flexible drive member to a driven member that is compact, economical and durable.

The attachment assembly comprises a yoke having laterally spaced side walls connected by a bridge wall, a connector attached to the bridge wall, and a coupler disposed between the side walls and attached to the yoke. The coupler has a plurality of spaced teeth for engaging in windows of the flexible drive member. An outer shoe engages each side wall of the yoke.

Each outer shoe preferably has a recess receiving the associated side wall and each outer shoe preferably has longitudinally spaced, forward, resilient bows and longitudinally spaced resilient side bows to facilitate sliding of the attachment in a channel. The attachment assembly may include an optional tensioning spring and the outer shoes may include fingers to provide an anti-rattle feature.

The flexible drive member attachment is preferably used in connection with a drive chain but can be adapted for attachment to other flexible drive members such as a flexible drive belt having spaced windows.

DETAILED DESCRIPTION OF PREFERRED EMBODIMENTS

Figure 1:
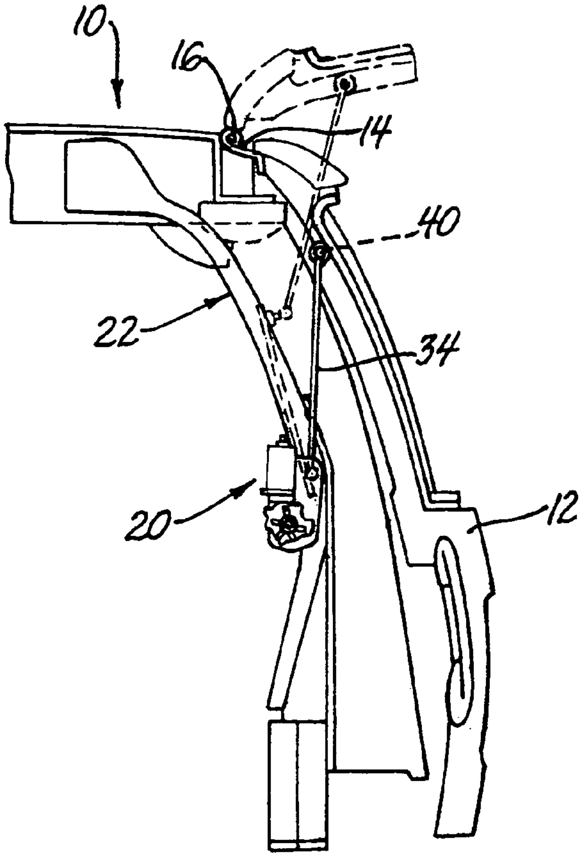
FIG. 1 is a fragmentary rear view of a vehicle equipped with a power operated lift-gate that includes an attachment assembly and drive unit of the invention.
Figure 2:
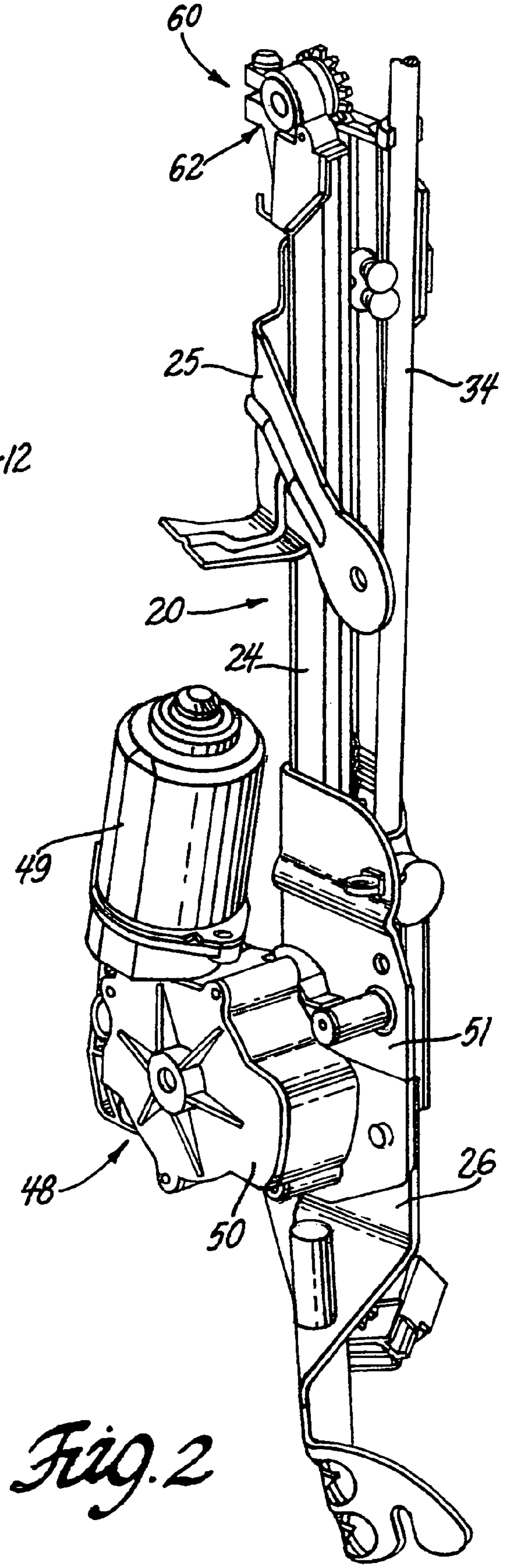
FIG. 2 is a perspective view of the drive unit shown in FIG. 1.

Referring now to the drawings, vehicle 10 has a closure or lift-gate 12 that is attached to the aft end of the vehicle roof by two hinge assemblies 14. Hinge assemblies 14 have hinge portions that are secured to a roof channel of the vehicle 10 and hinge portions that are secured to lift-gate 12 so that lift-gate 12 pivots about a substantially horizontal hinge axis 16 between a closed position shown in solid line in FIG. 1 and an open position shown in dashed lines in FIG. 1. Lift-gate 12 is generally permitted to pivot about 90° about the substantially horizontal hinge axis 16. However, the range of movement can be varied substantially from one model of vehicle to another.

Lift-gate 12 is opened and closed manually or by a suitable power operated closure system comprising two identical drive units 20 that are installed in the aft end of the vehicle body at the respective vertical body pillars 22, commonly referred to as the D pillars, that define the width of the rear opening that is closed by lift-gate 12. The typical drive unit 20 is shown in greater detail in FIGS. 2 through 6.

Each power unit 20 comprises a fixed rectangular guide channel 24 that is fixed to a body portion of the vehicle in a generally vertical orientation by upper and lower brackets 25 and 26 at or near the D pillar 22.

The rectangular guide channel 24 has an elongated longitudinal slot 27 in a rearward facing wall 28 of the guide channel 24 that faces toward lift-gate 12 when lift-gate 12 is in the closed position.

An attachment assembly 30 is disposed in the guide channel 24 and moves along in the guide channel. Attachment Assembly 30 has a universal connector in the form of a ball stud 32 that projects through slot 27. A rod 34 has a mating universal connector in the form of a socket 36 at one end that receives the ball stud 32 so that rod 34 is universally connected to assembly 30. Rod 34 has a socket 38 at an opposite end that is universally connected to a mating ball stud 40 attached to a side wall of the vehicle lift gate 12. It should be understood that any type of universal connector can be used between rod 34 and attachment assembly 30 at one end of rod 34 and between rod 34 and lift-gate 12 at the other end of rod 34 and that the positions of the ball studs and the sockets of the ball joints 32, 36 and 38, 40 of illustrated example can be reversed.

Figure 5:
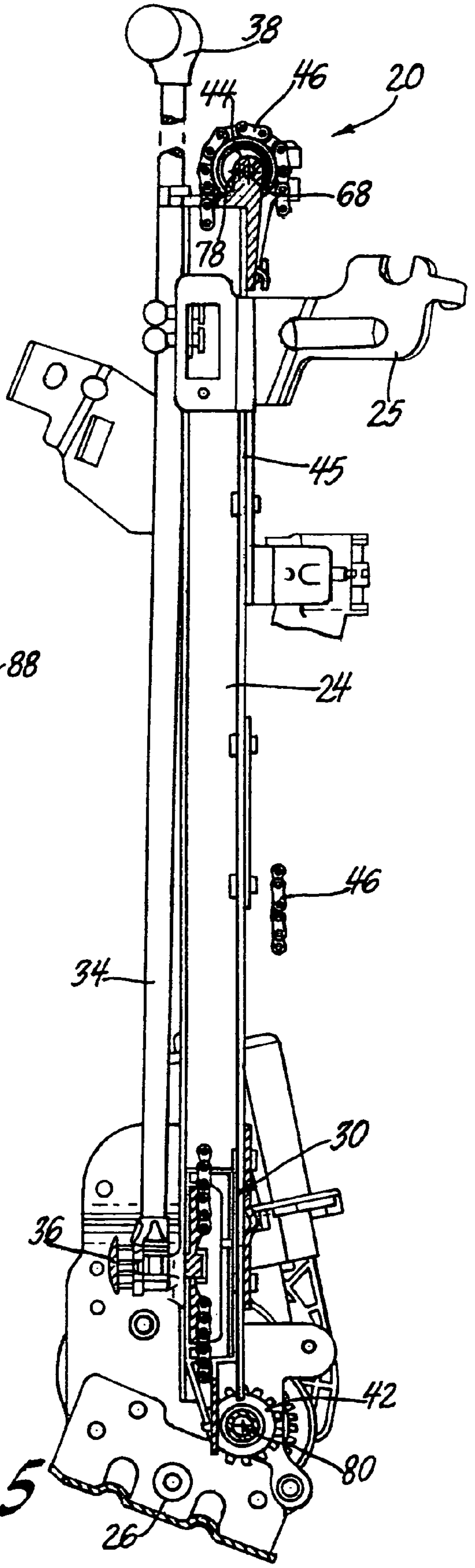
FIG. 5 is a longitudinal section of the drive unit shown in FIG. 2.

Drive unit 20 further comprises a first pulley 42 at a lower end of the guide channel 24 and a second pulley 44 at an upper end of the guide channel. A flexible drive member in the form of a drive chain 46 extends into the upper and lower open ends of guide channel 24. The opposite ends of drive chain 46 are attached to the opposite ends of attachment assembly 30 so that drive chain 46 is in effect, an endless flexible drive member that travels in a loop. The drive chain or flexible drive member 46 is trained solely around pulleys 42 and 44. More specifically drive chain 46 extends up from attachment assembly 30 directly to pulley 44, then wraps substantially 180 degrees around upper pulley 44, then extends directly down to lower pulley 42, then wraps substantially 180 degrees around lower pulley 42 and then extends directly back up to attachment assembly 30 as best shown in FIG. 5. In other words, flexible drive member 46 of drive unit 20 is engaged solely by two pulleys, drive pulley 42 and idler pulley 44 to form the flexible drive member 46 in a narrow loop having a width determined by the diameter of pulleys 42 and 44. Pulleys 42 and 44 preferably have equal diameters. This contributes to a very compact arrangement for drive unit 20. Pulleys 42 and 44 (which are preferably sprockets when a drive chain is used) are aligned with the end wall 45 of rectangular guide channel 24 so that the portions of the drive chain 46 between pulleys 42 and 44 inside as well as outside the guide channel 24 are spaced from the end wall 45.

Drive unit 20 further comprises a bi-directional power unit 48 that is drivingly connected to the lower pulley 42 so that power unit 20 drives drive chain 46 in one direction to move lift-gate 12 to the open position and in an opposite direction to move lift-gate 12 to the closed position. Power unit 48 is drivingly attached to a pulley at one end of the guide channel 24 for efficient packaging. Power unit 48 is preferably drivingly attached to the lower pulley 42 to minimize the intrusion into the load area of the vehicle but may be drivingly attached to the upper pulley 44. In any event, one pulley is a drive pulley while the other pulley is an idler pulley, or in the case of a chain drive unit, one is an idler sprocket while the other is a drive sprocket.

Bi-directional power unit 48 includes a reversible electric motor 49 and preferably an electromagnetic clutch 50 attached to the lower end of the guide channel 24 by a power unit bracket 51. Electromagnetic clutch 50 is driven by reversible electric motor 49 via a suitable gear set and lower pulley (drive sprocket) 42 is driven by electromagnetic clutch 50 through a second suitable gear set 52.

As indicated above, drive unit 20 includes a pulley 44 at the upper end of guide channel 24 that is an idler pulley or in the case of a chain drive unit, an idler sprocket. Pulley 44 may be part of an adjustable pulley assembly so that slack in flexible drive member 46 may be taken up when flexible drive member 46 is engaged solely by pulleys 42 and 44. A suitable adjustable pulley assembly is described in detail in co-pending application No. 11/217,113 filed Aug. 31, 2005.

Operation

The operation of the power operated closure system is as follows. When lift-gate 12 is in the closed position as shown in solid line in FIG. 1, attachment assembly 30 is at or near the bottom of the elongated slot 27 in guide channel 24 as best shown in FIG. 5. To open lift-gate 12, motor 49 and electromagnetic clutch 50 are energized to rotate lower pulley (drive sprocket) 42 clockwise as viewed in FIG. 5. This moves drive chain 46 clockwise in the loop defined by pulleys 42 and 44 and pulls attachment assembly 30 up in guide channel 24. As attachment assembly 30 is pulled up, lift-gate 12 is moved toward the open position by rod 34. Attachment assembly 30 is pulled up in guide channel 24 until lift-gate 12 is opened at which time assembly 30 is positioned at or near the top of elongated slot 27 in guide channel 24 as shown in phantom in FIG. 1. When lift-gate 12 is opened, a limit switch or the like is actuated to de-energize motor 49 and electromagnetic clutch 50.

Figure 6:
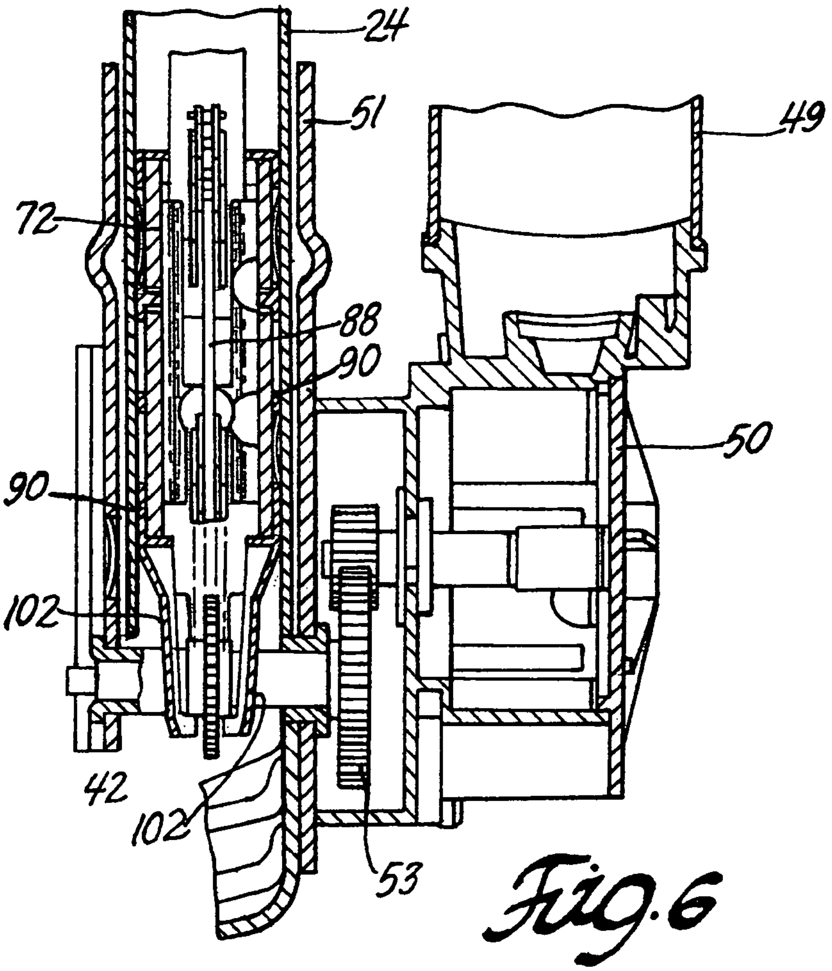
FIG. 6 is another longitudinal section of the lower end of the drive unit shown in FIG. 2.

The open lift-gate 12 shown in phantom in FIG. 1 is closed by energizing motor 49 and electromagnetic clutch 50 to rotate drive sprocket 42 counterclockwise as viewed in FIGS. 5. This moves drive chain 46 counterclockwise in its loop and pulls attachment assembly 30 down in guide channel 24. As attachment assembly 30 is pulled down, lift-gate 12 is moved toward the closed position by rod 34. Attachment assembly 30 is pulled down in guide channel 24 until lift-gate 12 is closed at which time attachment assembly 30 is positioned at or near the bottom of elongated slot 27 in guide channel 24 as shown in FIGS. 5 and 6. When lift-gate 12 is closed, a limit switch or the like is actuated to de-energize motor 49 and electromagnetic clutch 50.

The electromagnetic clutch 50 is de-energized after the lift-gate 12 is opened or closed to facilitate manual opening and closing of the lift-gate 12 in the event of power failure. However, the electromagnetic clutch 50 can be eliminated so long as the bi-directional electric motor 49 can be back driven by manual movement of the lift-gate in the event of a power failure.

Attachment Assembly

Figure 4:
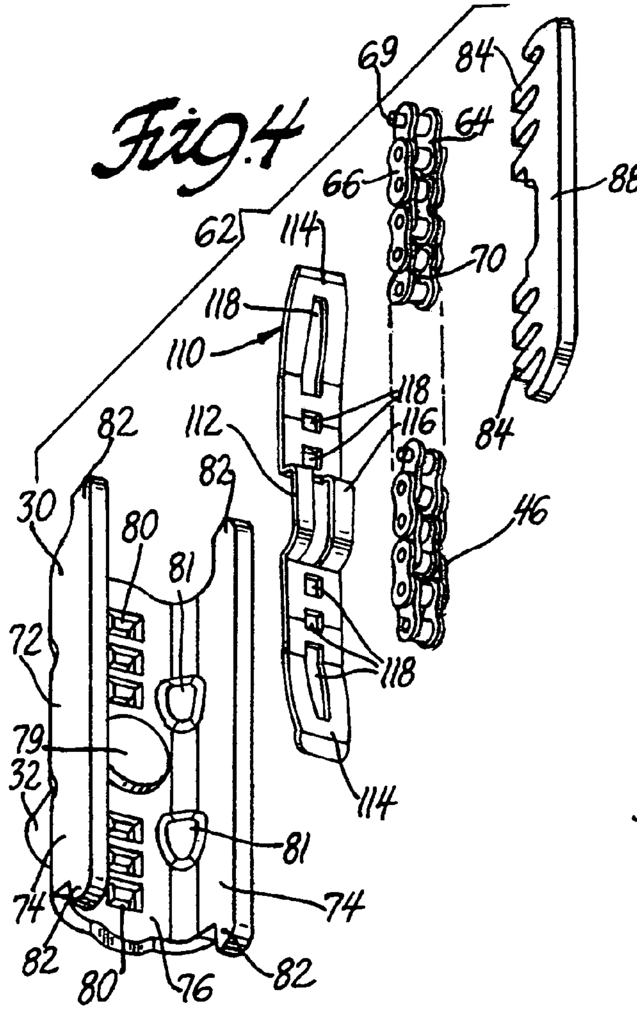
FIG. 4 is an exploded perspective view of the attachment assembly taken from a different angle.

As indicated above, attachment 30 is attached to a flexible drive member in the form of a drive chain 46. Chain 46 comprises inner and outer pairs of metal links 64 and 66 that are connected end-to end by pivot pins 69 forming a plurality of evenly spaced windows 70 as best shown in FIG. 4.

Attachment assembly 30 comprises a yoke 72 that has laterally spaced side walls 74 connected by a bridge wall 76 at one end. Bridge wall 76 has a round central hole (not shown) and a plurality of smaller square holes 80 on either side of the round central hole. Side walls 74 each have inwardly extending, part spherical dimples 81 near the bridge wall 76 to increase the strength and rigidity of yoke 72. Each side wall 74 also has upper and lower feet 82 that extend outwardly. Yoke 72 is preferably of stamped sheet metal construction for economy of manufacture.

Attachment assembly 30 includes the metal ball stud 32 for connecting assembly 30 to a driven member, such as socket ended rod 34, and a metal coupler 88 for connecting attachment assembly 30 to the drive chain 46. Ball stud 32 is suitably attached to bridge wall 76, for example by sticking stud end 79 in the round central hole of yoke 72 and spin riveting ball stud 32 to bridge wall 76. While yoke 72 and ball stud 32 are preferably two separate metal pieces, these elements can be combined into one piece. Moreover for some applications the yoke 72 and ball stud 32 can be of molded plastic construction.

Coupler 88 is also suitably attached to bridge wall 76, for example by riveting coupler 88 to bridge wall 76 as explained below. Coupler 88 is preferably of stamped sheet metal construction for economy of manufacture.

Figure 3:
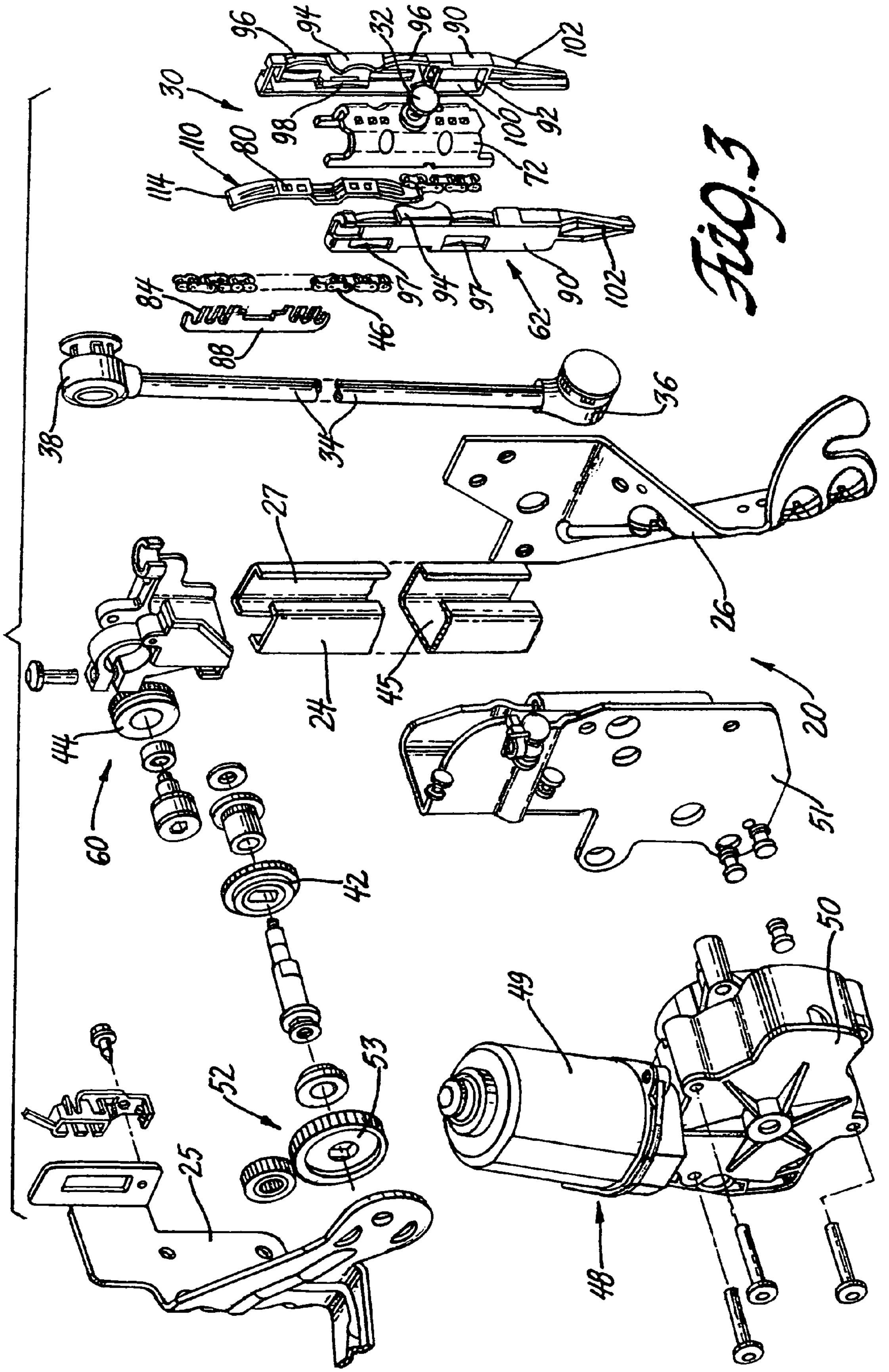
FIG. 3 is a partially exploded perspective view of the drive unit shown in FIG. 2 showing details of the attachment assembly.

Attachment assembly 30 also includes two shoes 90, FIG. 3, which are preferably of molded plastic construction for economy of manufacture. Each shoe 90 has a side wall recess 92 shaped to receive an associated side wall 74 of yoke 72 and a forward central flange 94 that engages bridge wall 76 around ball stud 32 as best shown in FIG. 3. Each shoe 90 has flexible, forward bows 96 on either side of the forward flange 94. Each shoe 90 also has flexible side bows 97 and flexible rearward bows 98 on either side of a rearward flange 100. Each shoe 90 has a depending, flexible tapered finger 102 that cooperates with the other tapered finger 102 as explained below. Shoes 90 are attached to yoke 72 by snap fitting each shoe 90 against one of the respective side walls 74 of yoke 72.

Coupler 88 is disposed between the side walls 74 of yoke 72. Coupler 88 has a plurality of square studs or teeth 84 formed as two sets of three evenly spaced that extend forward and through the square holes 80 with their protruding heads headed over to rivet coupler 88 to bridge wall 76. The two sets of evenly spaced teeth 84 each have at least two teeth that extend through respective ones of the windows 50 of drive chain 46, so that drive chain 12 is secured to yoke 72 by coupler 88 trapping the respective ends of drive chain 46 between the coupler body and the bridge wall 76. The sets of teeth 84 extend through respective windows 50 in each end of drive chain 46 and through the square holes 80 holes in yoke 72 where the free ends are headed. Thus attachment assembly 30 is drivingly attached to drive chain 46 very securely. Shoes 90 house yoke 72 and are preferably equipped with the laterally spaced, resilient, forward bows 96, the laterally spaced, resilient, side bows 97 and the laterally spaced, resilient rearward bows 98 so that the attachment assembly 62 slides easily and without rattling inside a channel such as the channel 24.

Attachment assembly 30 also preferably includes a chain tensioning spring 110. Spring 110 has a central mounting portion 112 with flexible spring arms 114 on each end. Central mounting portion 112 has a central depression 116 (to accommodate the deformed stud end 79 of ball stud 32) and windows 118 on either side of the central depression 116. Spring 110 is attached to assembly 30 by sandwiching mounting portion 112 of spring 110 between coupler 88 and the bridge wall 76 of yoke 72 so that teeth 84 extend through windows 118 when coupler 88 is attached to yoke 72 to connect the ends of chain 46 to attachment assembly 30. When spring 110 and chain 46 are both attached, spring arms 114 engage chain 46 to tension chain 46 and reduce noise.

Attachment assembly 30 preferably includes an anti-rattle feature that is of particular advantage when attachment assembly is used in conjunction with a drive unit that includes a gear set, such as the drive unit 20, that includes the gear set 52. Gear sets almost always include some gear lash. In some applications of the drive unit, for example a lift-gate application, this gear lash can allow the gear wheel 53 to oscillate back and forth rotationally and produce a rattle. To eliminate or at least substantially reduce this rattle, attachment assembly preferably includes the flexible tapered fingers 102 of shoes 90. These flexible tapered fingers 102 engage opposite sides of lower pulley (drive sprocket) 42 with a light clamping force that prevents oscillatory rotation of drive sprocket 42 and gear wheel 53 when the lift-gate is closed as best shown in FIG. 6.

Figure 7:
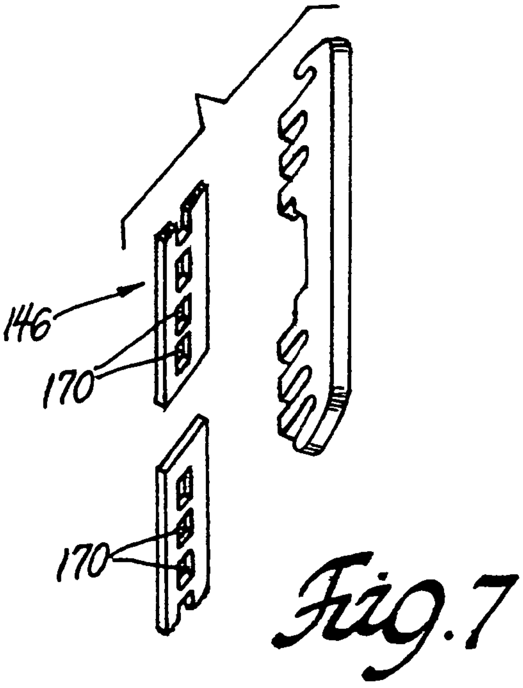
FIG. 7 is a perspective view of an alternate flexible drive member.
Figure 8:
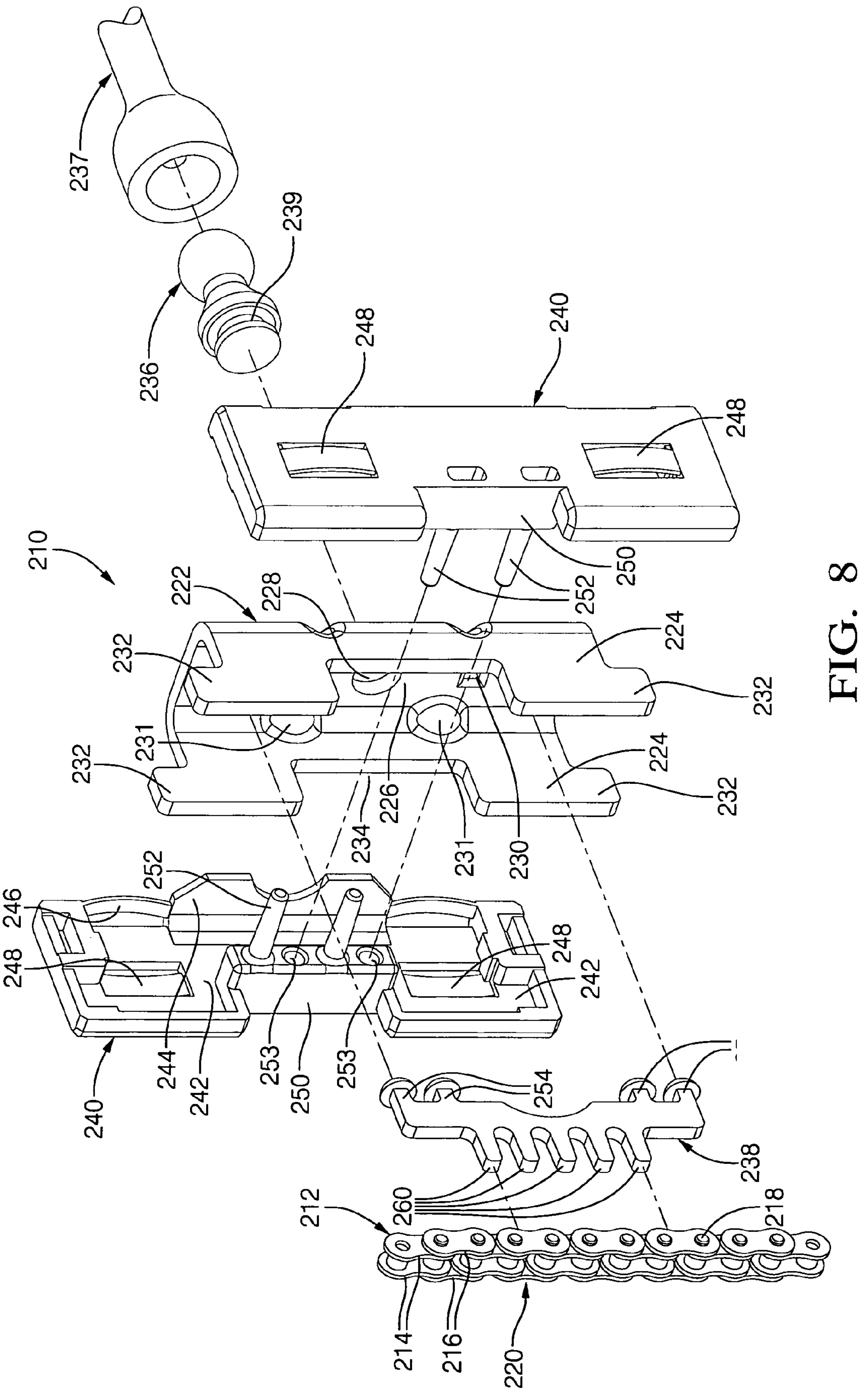
FIG. 8 is an exploded perspective view of another attachment assembly in accordance with the invention in combination with a drive chain.
Figure 9:
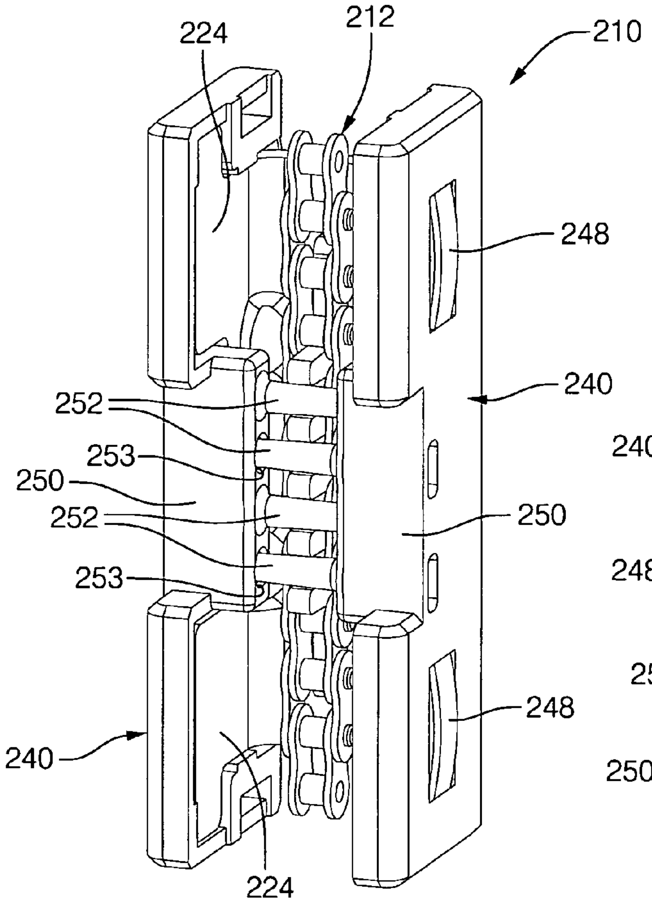
FIG. 9 is a perspective rear view of the attachment assembly of FIG. 8.
Figure 10:
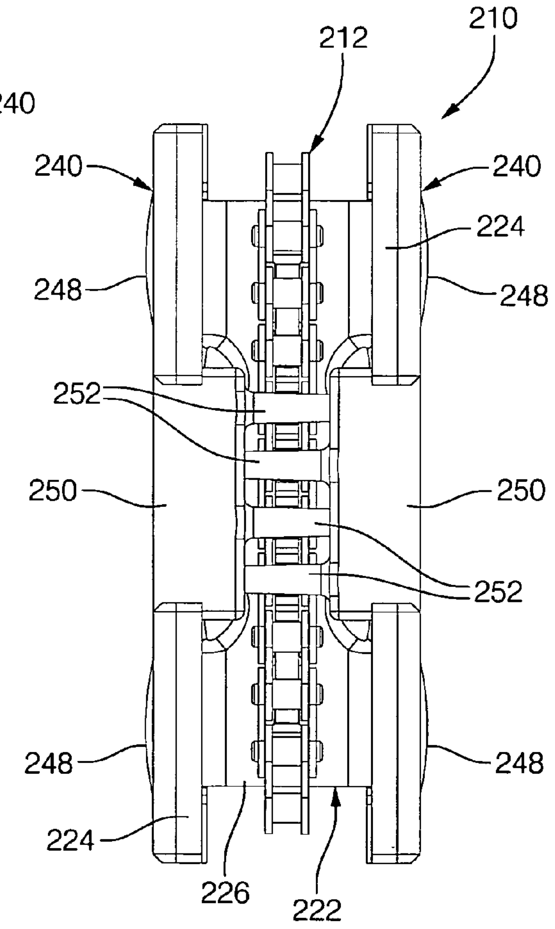
FIG. 10 is a rear view of the attachment assembly of FIG. 8.
Figure 11:
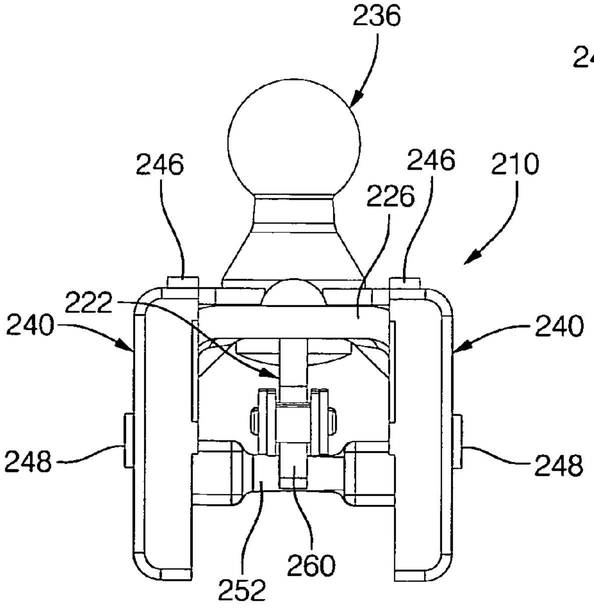
FIG. 11 is a top view of the attachment assembly of FIG. 8.
Figure 12:
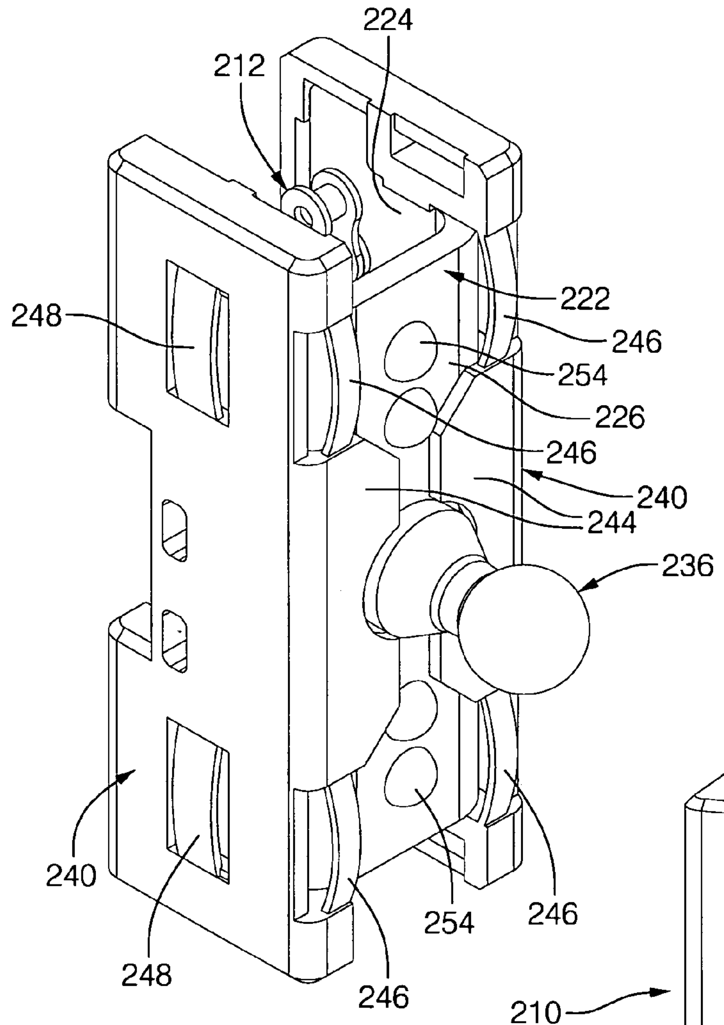
FIG. 12 is a perspective front view of the attachment assembly of FIG. 8.
Figure 13:
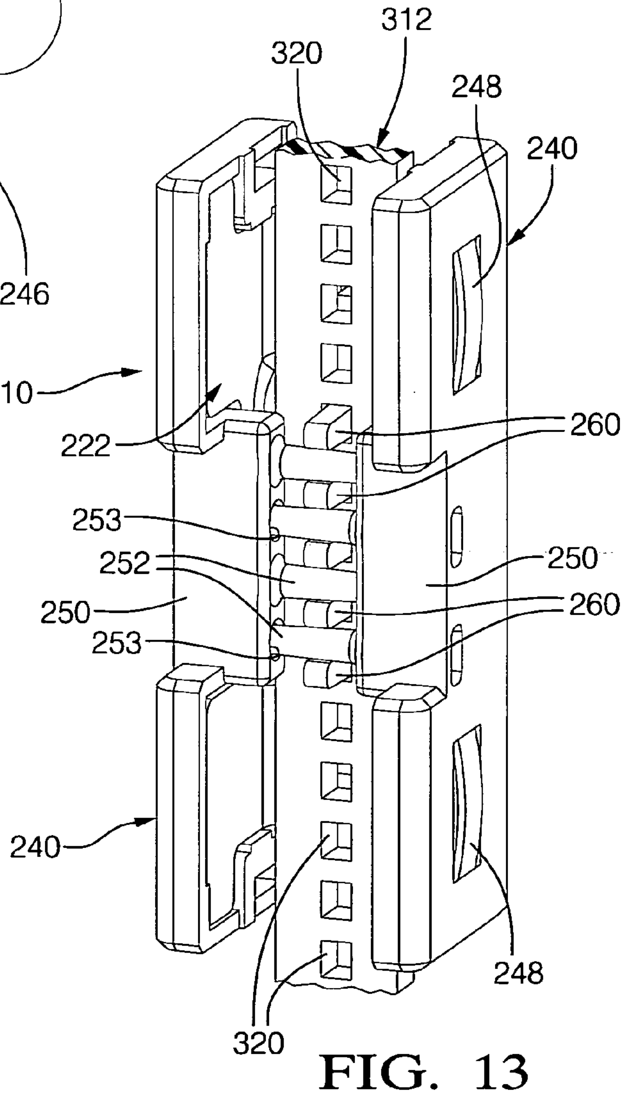
FIG. 13 is a perspective rear view of the attachment assembly of FIG. 8 in combination with a drive tape having spaced windows.

In FIGS. 1-6, the attachment assembly 30 has been illustrated in combination with a length of flexible drive chain 46 of the metal link type. However, the attachment assembly 30 can be used in conjunction with an endless flexible drive chain having its own master link or one which uses the attachment assembly 30 as the master link. Moreover, the attachment assembly 30 can be used in conjunction with other types of flexible drive members, such as the flexible drive belt 146 having regularly spaced windows 170 that is shown in FIG. 7 and in FIG. 6 of U.S. Pat. No. 6,367,864 discussed above.

Alternate Attachment Assembly

Referring now to FIGS. 8-13, another attachment assembly 210 of the invention is illustrated in connection with a flexible drive member having a plurality of evenly spaced windows, such as, a metal drive chain 212. Chain 212 comprises inner and outer pairs of metal links 214 and 216 that are connected end-to end by pivot pins 218 forming a plurality of evenly spaced windows 220.

Attachment assembly 210 comprises a yoke 222 that has laterally spaced side walls 224 connected by a bridge wall 226 at one end. Bridge wall 226 has a round central hole 228 and a plurality of smaller square holes 230 on either side of the round central hole 228. Side walls 224 each have inwardly extending, part spherical dimples 231 near the bridge wall 226 to increase the strength and rigidity of yoke 222. Each side wall 224 also has upper and lower feet 232 that extend outwardly and that are separated by a central slot 234 at the rearward end of yoke 222. Yoke 222 is preferably of stamped sheet metal construction for economy of manufacture.

Attachment assembly 210 includes a metal ball stud 236 for connecting attachment 210 to a driven member, such as socket ended rod 237, and a metal coupler 238 for connecting the attachment 210 to the drive chain 212. Ball stud 236 is suitably attached to bridge wall 226, for example by sticking stud end 239 in hole 228 and spin riveting ball stud 236 to bridge wall 226. Coupler 238 is also suitably attached to bridge wall 226, for example by riveting coupler 238 to bridge wall 226 as explained below. Coupler 228 is preferably of stamped sheet metal construction for economy manufacture.

While yoke 222, ball stud 236 and coupler 238 are preferably three separate metal pieces, these elements can be combined into one or two pieces. Moreover for some applications the yoke 222, ball stud 236 and coupler 238 can be of molded plastic construction.

Attachment assembly 210 also includes two shoes 240 that are preferably of molded plastic construction for economy of manufacture. Each shoe 240 has a side wall recess 242 shaped to receive an associated side wall 224 of yoke 222 and a forward central flange 244 that engages bridge wall 226 around ball stud 236. Each shoe 240 has flexible, forward bows 246 on either side of the forward flange 244. Each shoe 240 also has flexible side bows 248 on either side of a rearward flange 250. Each rearward flange 250 has two tapered fingers 252 that extend toward the other flange with their tips disposed in sockets 253 of the other flange. Shoes 240 are attached to yoke 222 by attaching shoes 240 to each other by interconnecting fingers 252 and sockets 253 so that shoes 240 lie against the respective side walls 224 of yoke 222 with their rearward flanges 250 extending through respective slots 234.

Coupler 238 is disposed between the side walls 224 of yoke 222. Coupler 238 has a plurality of square studs 254 extending forward and through the square holes 230 with their protruding heads headed over to rivet coupler 238 to bridge wall 226. Coupler 238 also has a plurality of evenly spaced teeth 256 extending rearward and through respective ones of the windows 220 of drive chain 212. Drive chain 212 is trapped in yoke 222 by the tapered fingers 252 of shoes 240 which extend through respective spaces between adjacent teeth 256 of coupler 238 behind drive chain 212 and into associated sockets 253 of the other shoe. Thus attachment 210 is drivingly attached to drive chain 212 very securely. Shoes 240 house yoke 212 and are preferably equipped with the laterally spaced, resilient, forward bows 246 and the laterally spaced, resilient, side bows 248 so that the attachment 210 can slide easily and without rattling inside a channel such as the channel 24 discussed above in connection with FIGS. 2 through 6.

In FIGS. 8-13, the attachment assembly 210 has been illustrated in combination with a length of flexible drive chain of the metal link type. However, the attachment assembly 210 can be used in conjunction with an endless flexible drive chain having its own master link or one which uses the attachment assembly 210 as the master link. Moreover, the attachment assembly 210 can be used in conjunction with other types of flexible drive members, such as the flexible drive belt 146 having regularly spaced windows 170 that is shown in FIG. 7 and in FIG. 6 of U.S. Pat. No. 6,367,864 discussed above.

The attachment assemblies 30 and 210 may be used on power operated liftgates or sliding doors of automobiles or minivans as indicated by U.S. Pat. No. 6,387,864. However, the attachment assemblies 30 and 210 have many other uses-virtually any application or operating system involving a flexible drive member having spaced windows. In other words, it will be readily understood by those persons skilled in the art that the present invention is susceptible of broad utility and application. Many embodiments and adaptations of the present invention other than those described above, as well as many variations, modifications and equivalent arrangements, will be apparent from or reasonably suggested by the present invention and the foregoing description, without departing from the substance or scope of the present invention. Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the following claims and the equivalents thereof.

We claim:

1. An attachment assembly for connecting a flexible drive member having a plurality of spaced windows to a driven member, the attachment assembly comprising:

a yoke having laterally spaced side walls connected by a bridge wall, the yoke having a connector attached to the bridge wall, a coupler disposed between the side walls and attached to the yoke, the coupler having a plurality of spaced teeth that are adapted to extend through the plurality of spaced windows of the flexible drive member, and wherein the plurality of spaced teeth extend through holes in the bridge wall of the yoke.

2. The attachment assembly as defined in claim 1 wherein the attachment assembly includes an outer shoe adjacent each side wall of the yoke, each outer shoe having a forward flange that engages the bridge wall and a rearward flange that engages a rearward edge of the associated side wall.

3. The attachment assembly as defined in claim 2 wherein the attachment assembly includes a spring that has a central mounting portion and spring arms at each end, the central mounting portion being sandwiched between the bridge wall and the coupler.

4. The attachment assembly as defined in claim 1 wherein the plurality of teeth are arranged in two equally spaced sets of teeth.

5. The attachment assembly as defined in claim 1 wherein the plurality of spaced teeth extend away from the bridge wall.

6. The flexible drive attachment as defined in claim 1 wherein the attachment assembly includes an outer shoe adjacent each side wall of the yoke, each outer shoe having longitudinally spaced, resilient, forward bows and longitudinally spaced, resilient side bows.

7. The flexible drive member attachment as defined in claim 1 wherein the attachment assembly includes an outer shoe adjacent each side wall of the yoke, each outer shoe having a recess receiving the associated side wall.

8. The flexible drive member attachment of claim 1 wherein the flexible drive member attachment is adapted for connection to a drive chain.

9. A drive unit comprising a flexible drive member having a plurality of evenly spaced windows and a flexible drive member attachment comprising:

a yoke having laterally spaced side walls connected by a bridge wall, a stud connector attached to the bridge wall, a coupler disposed between the side walls, the coupler having a plurality of spaced teeth extending through respective ones of the windows of the flexible drive member, an outer shoe adjacent each side wall, each outer shoe having a forward flange engaging the bridge wall, a rearward flange that engages a rearward edge of the associated side wall, and wherein the plurality of spaced teeth extend through holes in the bridge wall of the yoke.

10. An attachment assembly for connecting a flexible drive member having a plurality of spaced windows to a driven member, the attachment assembly comprising:

a yoke having laterally spaced side walls connected by a bridge wall, the yoke having a connector attached to the bridge wall, a coupler disposed between the side walls and attached to the yoke, the coupler having a plurality of spaced teeth that are adapted to extend through the plurality of spaced windows of the flexible drive member, and a spring that has a central mounting portion and spring arms at each end, the central mounting portion being sandwiched between the bridge wall and the coupler.

11. A drive unit comprising a flexible drive member having a plurality of evenly spaced windows and a flexible drive member attachment comprising:

a yoke having laterally spaced side walls connected by a bridge wall, a stud connector attached to the bridge wall, a coupler disposed between the side walls, the coupler having a plurality of spaced teeth extending through respective ones of the windows of the flexible drive member, an outer shoe adjacent each side wall, each outer shoe having a forward flange engaging the bridge wall, a rearward flange that engages a rearward edge of the associated side wall, and wherein each shoe has longitudinally spaced, resilient, forward bows and longitudinally spaced, resilient side bows.

* * * * *